N. B. DOWN.
METHOD OF AND APPARATUS FOR FILTERING.
APPLICATION FILED JAN. 2, 1920.

1,348,159.

Patented Aug. 3, 1920.
2 SHEETS—SHEET 1.

Norman B. Down, Inventor
By his Attorneys

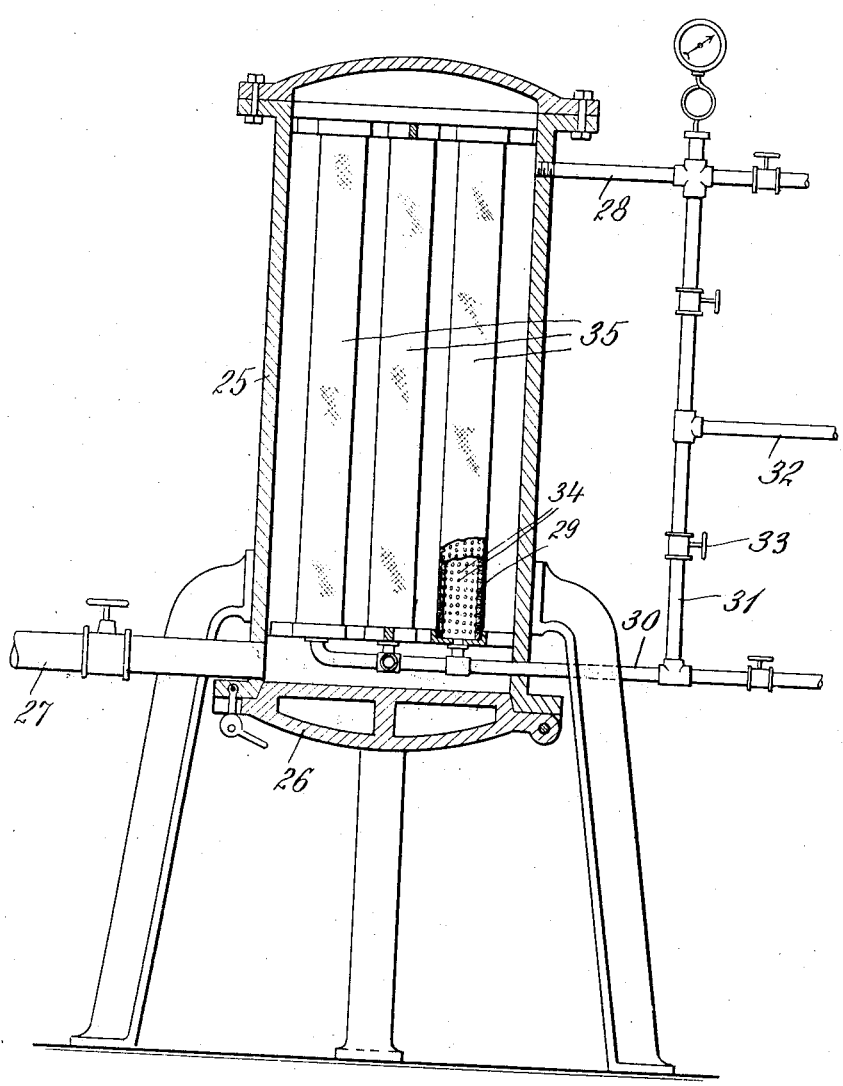

UNITED STATES PATENT OFFICE.

NORMAN B. DOWN, OF SEWELL, CHILE, ASSIGNOR TO BRADEN COPPER COMPANY, A CORPORATION OF MAINE.

METHOD OF AND APPARATUS FOR FILTERING.

1,348,159.  Specification of Letters Patent.  Patented Aug. 3, 1920.

Application filed January 2, 1920. Serial No. 348,959.

*To all whom it may concern:*

Be it known that I, NORMAN B. DOWN, a subject of Great Britain, residing at Sewell, Chile, have invented certain new and useful Improvements in Methods of and Apparatus for Filtering; and I do hereby declare the following to be a full, clear, and exact description of the invention, such as will enable others skilled in the art to which it appertains to make and use the same.

This invention relates to the separation of solids from liquids by filtration and particularly to the production of a dry filter cake in an economical and efficient manner.

Among well known methods of separating suspended solids from liquids in metallurgical and industrial operations, is the common practice of introducing the material to be filtered, under pressure, into a closed chamber in which filter leaves, having outlet connections for liquids, are suspended. These filter leaves commonly consist of frames over which filter cloths are stretched to present flat surfaces upon which the solids accumulate in the form of a cake. It is frequently desirable to dry the cake after it has accumulated, and for this purpose air is introduced under pressure to the chamber and escapes through the leaf outlets after passing through the cake and taking up more or less moisture.

In such a filtering operation, the cake shrinks materially as the moisture is removed, and shrinkage results in the formation of cracks, in the surface of the cake, which gradually extend through the cake to the filtering medium, thereby forming paths through which the air readily passes. As soon as such cracks form, the air will no longer penetrate the cake and the cake must be discharged without accomplishing the desired drying.

It is the object of the present invention to overcome the difficulties heretofore experienced in producing relatively dry filter cake, and to provide a method of and apparatus for separating and drying solids suspended in liquids which combines high tonnage capacity and efficient and economical removal of moisture.

Further objects and advantages of my invention will be apparent as it is better understood by reference to the following specification and the accompanying drawing, in which I have illustrated apparatus adapted to accomplish the desired results, it being understood, however, that the drawing is illustrative merely, and that the invention may be embodied in varied mechanical form without departing from the essentials thereof. In the drawing, Figure 1 is a sectional view of a portion of an ordinary filter leaf showing shrinkage cracks developed to a point, preventing further drying;

Fig. 4 is a vertical section through a slightly different form of filter.

Figure 1:
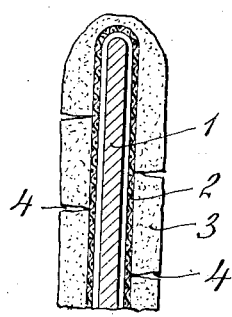

As above noted, in operating an ordinary filter of the leaf type, cracks develop in the cake when an attempt is made to dry the material by passing air therethrough. This result is illustrated in Fig. 1 of the drawing in which 1 indicates the frame of a filter leaf upon which the filter medium 2 is stretched. It is assumed, that the leaf is disposed within a suitable chamber into which the liquid suspension is forced under pressure. When the cake 3 is of the desired thickness, the material in suspension is withdrawn and air is forced into the chamber. The cake dries rapidly and at the same time shrinks and cracks as indicated at 4 in the drawing, the cracks extending, at an early stage of the drying, entirely through the cake to the filter medium.

Figure 2:
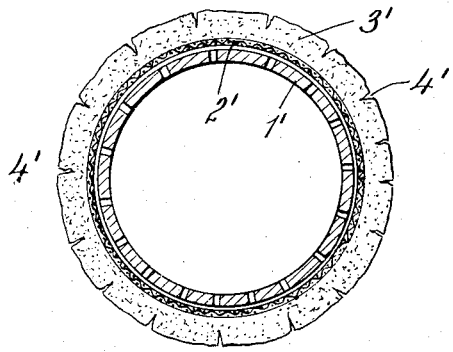
Fig. 2 is a similar view illustrating the application and result of my invention.

I have discovered that this tendency of the filter cake to crack during drying may be overcome by depositing the cake upon a curved surface, preferably cylindrical as indicated in Fig. 2 of the drawing in which 1' indicates the supporting frame,—which may advantageously be a perforated tube,—for a filter medium 2'. The cylindrical tube is presumed to have replaced the leaves in the chamber described in connection with Fig. 1 and the general mode of procedure is the same. A distinctively different result is accomplished, however, as it is found that such cracks as develop upon the application of air to the cake 3' for drying, are surface cracks merely as indicated at 4', and do not extend through to the filter medium even after prolonged application of the air. It is, therefore, possible to continue the drying action of the air and thereby remove moisture efficiently to a point which results in a drier cake than has heretofore been recovered as a result of the operation described.

Figure 3:
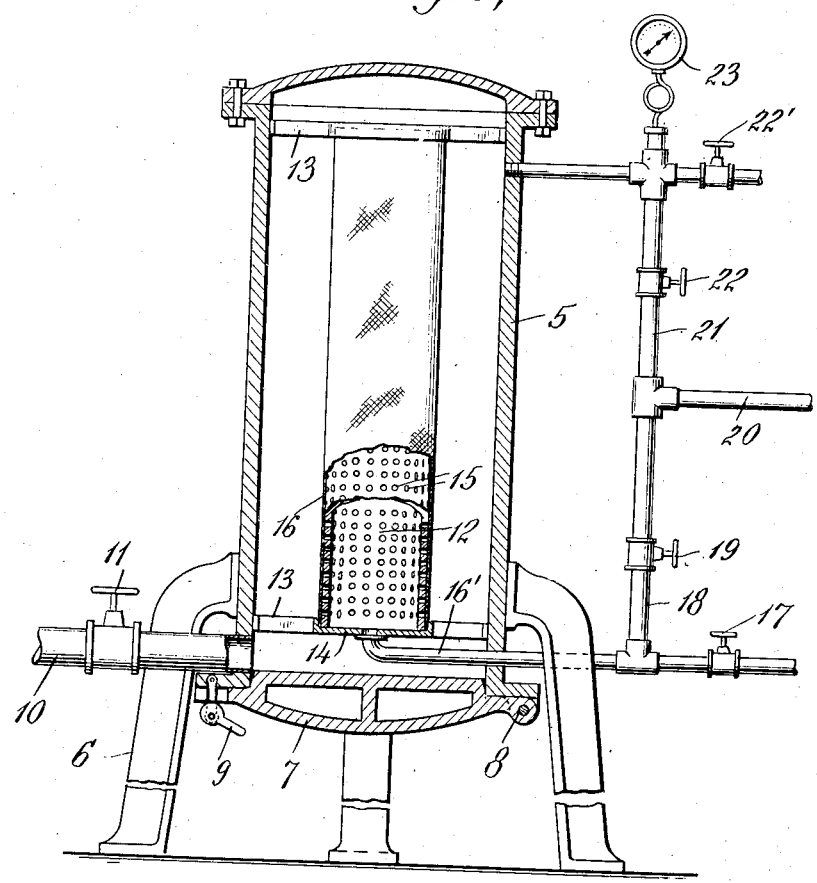
Fig. 3 is a vertical section through one type of filter adapted for the accomplishment of the desired object.

The filtering operation is best carried out with a vertically arranged filter element although horizontal or inclined elements may be successfully employed. In Fig. 3 of the drawing I have illustrated an apparatus embodying a single filter element. A cylindrical casing 5 is suspended, or suitably supported, as by legs 6, and provided at its lower end with a movable head 7 preferably hinged at 8 and having a locking device 9 whereby the head is clamped tightly to the end of the casing to form an air and water tight joint. A pipe 10, having a valve 11, connects the lower end of the casing with a source of the material to be filtered, a suitable pump (not shown) being employed to force the material into the cylinder under the desired pressure.

Within the casing 5, a cylinder 12 is supported by spiders 13. The cylinder 12 is provided with heads 14 and, between the heads, is perforated as at 15. A filter medium 16, such as ordinary filter cloth, monel metal fabric or cocoa matting is disposed about the cylinder 14 in such a manner as to permit the passage of liquids through the medium and the perforations 15 into the interor of the cylinder 12, while the solids are retained on the surface of the filter medium thus forming a cake.

The filtrate is withdrawn through a pipe 16' having a valve 17 and a connection through a pipe 18 and valve 19 with an air line 20 communicating with a source of air under pressure. A pipe 21, having a valve 22, connects the air line with the interior of the casing 5, and a pressure gage 23, connected to the pipe 21, indicates the pressure within the casing 5.

In the operation of the apparatus, the material to be filtered is supplied under pressure through the pipe 10 and the pressure is maintained until a cake of the desired thickness is formed, the filtrate being withdrawn through the pipe 16. When the cake is formed, air under pressure is introduced through the pipe 21 to force the surplus material out of the casing through the pipe 10. The air is thereafter supplied until the cake is substantially dry. The pressure within the casing is then released by opening the valve 22', the valve 22 being previously closed, and air is admitted through the pipe 16' to the interior of the cylinder 12, to blow off the cake, after the head 7 has been dropped.

As previously noted, cracks which normally appear in cakes formed on plane filter leaves do not, in the filter described employing a curved filter surface, extend through the cake, and the supply of air may be continued to carry the drying operation to a point, which cannot be attained in filters employing ordinary filter leaves. As the diameter of the cylinder increases the tendency of the cracks to extend through the cake also increases. I have found that cylinders materially exceeding sixteen inches in external diameter offer no apparent advantage over plane filter leaves but that below this diameter the increased efficiency of the filter in producing dry cake is very marked. The best results are accomplished when the diameter of the filter surface varies between six and eight inches.

I have also discovered that filters of small diameter have a higher tonnage capacity in an apparatus of given dimensions. Such an apparatus is illustrated in Fig. 4 of the drawing, in which a cylinder 25 is mounted as in the preceding embodiment of my invention and provided with a movable head 26 to permit dumping of the finished cake. A pipe 27 supplies the material to be treated to the casing and air is admitted through a pipe 28, to force the surplus material out of the casing when the cake has been formed and to dry the cake.

A plurality of filter tubes 29 are supported within the casing 25 and are provided with outlet connections to a pipe 30 through which the filtrate is withdrawn. A pipe 31 connects the pipe 30 to an air supply line 32, the admission of air to the pipe 30 being controlled by a valve 33 which is closed except when it is desirable to admit air to the tubes 29 to blow off the cake. The tubes 29 are perforated as indicated at 34 and are covered with a filter medium 35 so that liquids readily pass to the interior of the tubes while the solids are retained to form a cake. The cycle of operations is substantially identical with that previously described.

In addition to the advantage noted with respect to cracks in the cake and the production of dry cake, the filter herein described is exceedingly economical in floor space required, tonnage capacity per unit of filtering area, and in rapidity of operation to produce substantially dry cake as compared with the well known types of leaf filters. The primary novelty of my invention rests, however, in the discovery of the advantage of employing curved filter surfaces where it is desirable to produce a dry filter cake. I desire to claim, therefore, as my invention, a method of and apparatus for producing dry filter cake by depositing such a cake upon a curved surface and passing air through the cake until the desired drying is accomplished, the diameter of the surface being such as to prevent the formation of shrinkage cracks extending through the cake.

Various changes may be made in the details of operation as well as in the form of apparatus employed, without departing from the invention or sacrificing any of its advantages.

I claim:

1. A method of separating solids from liquids and producing substantially dry filter cake which comprises, depositing the solids upon a curved filter surface through which the liquid is permitted to pass, withdrawing the surplus unfiltered material and passing a gaseous medium through the cake formed by the solids on said surface, the curvature of said surface being such that cracks, forming in the cake as the material dries, do not extend through the cake to said surface.

2. A method of separating solids from liquids and of producing substantially dry filter cake which comprises, depositing the solids upon a convexly curved filter surface through which the liquid is permitted to pass, withdrawing the surplus unfiltered material and passing air through the cake formed by the solids on said surface, the radius of curvature of said surface being not substantially more than eight inches.

3. A method of separating solids from liquids and of producing substantially dry filter cake, which comprises, depositing the solids upon a cylindrical filtering surface through which the liquid is permitted to pass, withdrawing the surplus of unfiltered material, passing air through the cake formed by the solids on said surface, the diameter of said surface being not substantially more than sixteen inches, and reversing the flow of air through said surface to discharge said cake when the moisture has been substantially eliminated therefrom.

4. A method of separating solids from liquids and of producing substantially dry filter cake, which comprises, depositing the solids upon a curved filter surface, the diameter of which is between six and eight inches, withdrawing the liquid through said surfaces and passing air through the cake formed by the solids on said surface.

5. In an apparatus for separating solids from liquids and for producing substantially dry filter cake, the combination of a casing adapted to sustain pressure, a cylindrical filter element disposed therein, means for introducing the material to be filtered to said casing, means for withdrawing the filtrate from said element, means for introducing a gaseous medium under pressure to said casing, and a closure for said casing, which, when open, permits the discharge of the cake formed on said filter element.

6. In an apparatus for separating solids from liquids and for producing substantially dry filter cake, the combination of a casing adapted to sustain pressure, a cylindrical filter element vertically disposed therein, the diameter of said filter element being not substantially more than sixteen inches, means for introducing the material to be filtered to said casing, means for withdrawing the filtrate from said element, means for introducing a gaseous medium under pressure to said casing, and a closure at the bottom of said casing which, when open, permits the discharge of the cake formed on said filter element.

7. In an apparatus for separating solids from liquids and for producing substantially dry filter cake, the combination of a casing adapted to sustain pressure, a plurality of cylindrical filter elements vertically disposed therein, the diameter of said filter elements being not substantially more than sixteen inches, means for introducing material to be filtered to said casing, means for withdrawing the filtrate from said elements, means for introducing a gaseous medium under pressure to said casing, and a closure at the bottom of said casing which, when open, permits the discharge of the cake formed on said filter elements.

In testimony whereof I affix my signature.

NORMAN B. DOWN.